HORIZONTAL SYNC PULSE GENERATION FOR VIDEO
RECORDING EMPLOYING MAGNETIC GEAR WHEEL
Filed Jan. 21, 1966

3,470,317
Patented Sept. 30, 1969

3,470,317

HORIZONTAL SYNC PULSE GENERATION FOR VIDEO RECORDING EMPLOYING MAGNETIC GEAR WHEEL

Nobutoshi Kihara, Tokyo, Japan, assignor to Sony Corporation, Tokyo, Japan, a corporation of Japan Filed Jan. 21, 1966, Ser. No. 522,310
Claims priority, application Japan, Jan. 23, 1965, 40/3,549, 40/3,550
Int. Cl. H04n 5/76
U.S. Cl. 178—6.6 5 Claims

ABSTRACT OF THE DISCLOSURE

In an apparatus for recording and reproducing video signals having rotatable head means for scanning a magnetic medium; horizontal synchronizing pulses are produced by a gear rotatable with the head means and having a predetermined number of magnetic spaced teeth which move past a pickup head means.

This invention relates to a magnetic recording and reproducing system, and more particularly to a magnetic recording and reproducing system including means for generating vertical and horizontal synchronizing pulses in response to rotation of a rotary magnetic head.

By the provision of vertical and horizontal synchronizing pulse signal generators in a magnetic recorder for recording video output signals of the television camera, synchronizing pulses from the generators can be utilized as synchronizing pulses of the camera and consequently the television camera can be simplified in structure. To this end, a gear having 525 magnetic gear teeth is mounted on the rotary shaft of a rotary head; a pickup head having wound thereon a pickup coil is placed opposite the gear; two magnetic pieces are provided opposite on the periphery of a disc affixed to the rotary shaft along a diameter of the disc; and a magnetic core having wound thereon a pickup coil is placed in opposing relation to the underside of the disc. With such an arrangement, driving of the rotary shaft at 30 c./s. produces horizontal synchronizing pulses of 15.75 kc. from the pickup coil wound on the pickup head and vertical synchronizing pulses of 60 c./s. from that on the magnetic core. These synchronizing pulses can be utilized as synchronizing signals of the camera or television receiver.

However, difficulties are encountered in the manufacture of the gear especially for production of horizontal synchronizing pulses. That is, since accuracy of machining of the gear has its limits, fluctuation of pulse period inevitably occurs. In other words, irregularity of space between adjacent teeth causes jitter, irregular rotation of a gear shaper or grinder for the manufacture of a pickup head having about 30 gear teeth causes wow and uneven rotation of the gear or the gear shaper also causes wow. When the camera is operated with horizontal synchronizing signals subjected to fluctuation such as the aforementioned jitter and wows, the reproduced picture is adversely affected such that vertical picture content thereof is made to be zigzag shape by the jitter, snaked by the first-mentioned wow and swayed to the right and left by the second-mentioned wow at every field.

Accordingly, it is one object of this invention to provide a magnetic recording and reproducing system having means for generating vertical and horizontal synchronizing pulses in response to rotation of a rotary magnetic head.

It is another object of this invention to provide a magnetic recording and reproducing system having means for generating stable horizontal synchronizing pulses.

Other objects, features and advantages of this invention will become apparent from the following description taken in conjunction with the accompanying drawings, in which.

Figure 1:
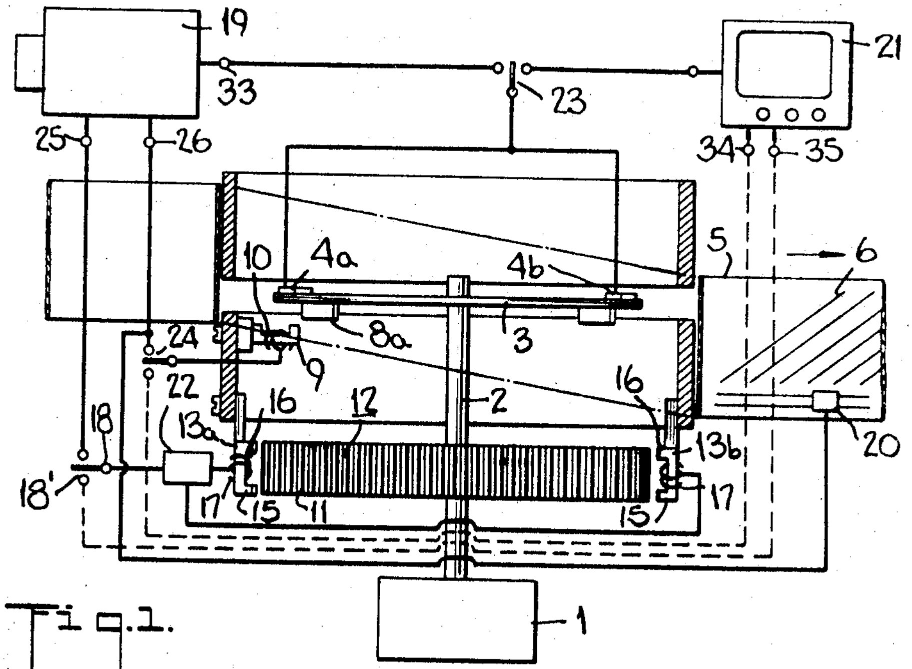
FIGURE 1 is a diagram schematically illustrating one example of a magnetic recording and reproducing system according to this invention.
Figure 2:
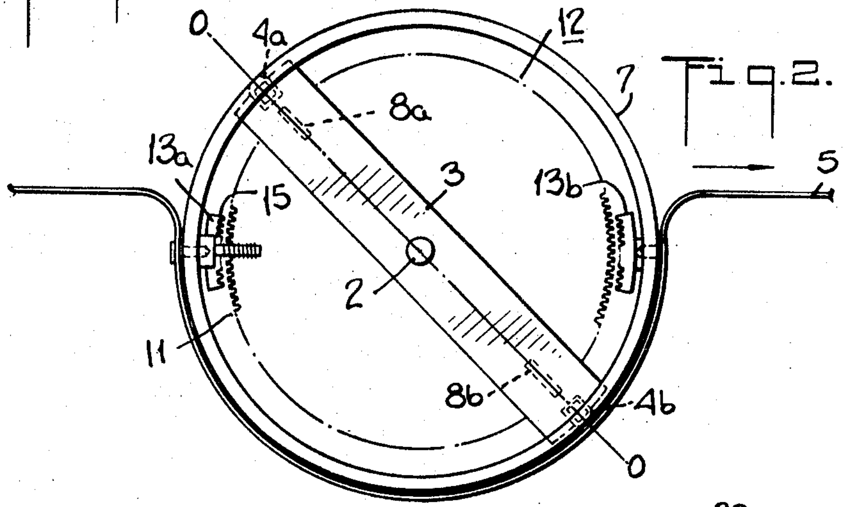
FIGURE 2 is its top plan view.

Referring to the drawings, one example of the magnetic recording and reproducing system according to this invention will hereinafter be described in detail.

Reference numeral 1 indicates a motor for driving a disc 3 affixed to a rotary shaft 2 of the motor 1. The periphery of the disc 3 has attached thereto at spaced intervals two magnetic heads 4*a* and 4*b*, the heads being spaced apart an angular distance of, for example, approximately 180°. A magnetic tape 5 is directed around a cylindrical guide member 7 obliquely to the rotational plane of the rotary magnetic heads such that the tape 5 covers an angular range of approximately 180°. In this manner video signals are sequentially recorded on the magnetic tape 5 by forming thereon a skew magnetic track 6 for one field and/or reproduced therefrom. Further, vertical and horizontal synchronizing pulse generators are provided in relation to the rotary shaft 2. The vertical synchronizing pulse generator may be constituted in the following manner. That is, magnetic strips 8*a* and 8*b* are provided on the underside of the disc 3 in opposing relation to each other along the line 0—0 crossing the rotary shaft 2 at right angles thereto, in such a manner that the strips 8*a* and 8*b* may be substantially in parallel to the line 0—0. Further, a magnetic core 9 projecting toward the shaft 2 is secured to the inside of the cylindrical tape guide member 7 under the disc 3 and a pickup coil 10 is wound on the magnetic core 9.

Figure 3:
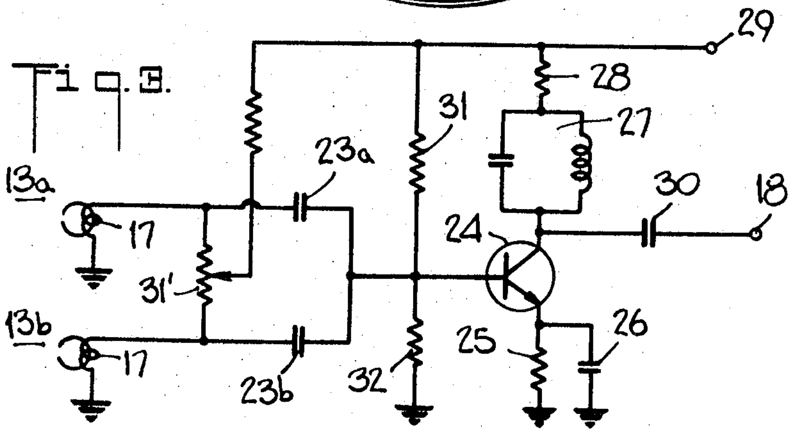
FIGURE 3 is a connection diagram illustrating in block form one example of a mixer employed in this invention.

The horizontal synchronizing pulse generator is constituted in the following manner. That is, a gear 12 is mounted on the rotary shaft 2 under the cylindrical tape guide member 7, the gear 12 having formed on the periphery thereof at equiangular intervals 525 magnetic gear teeth 11, and two pickup heads 13*a* and 13*b* are provided in opposing relation to the periphery of the gear 12, preferably symmetrical with respect to the rotary shaft 2. The pickup heads 13*a* and 13*b* may be magnetic cores each having wound thereon a pickup coil as would be the case with the vertical synchronizing pulse generator. In such a case, however, the magnetic core has magnetic teeth 15 spaced at substantially the same angular intervals as those of the gear 12 and corresponding to more than thirty magnetic gear teeth 11, a groove 16 being formed in the intermediate portion of the teeth 15 in the transverse direction thereof and a pickup coil 17 common to all the teeth 15 being wound on the core through the groove 16. Such pickup heads are positioned under the cylindrical tape guide member 7 at places symmetrical with respect to the rotary shaft 2 in such a manner that the teeth 15 may confront those 11 of the gear 12. With such an arrangement, detected pulses from the pickup heads 13*a* and 13*b* are added together at a mixer circuit 22 and horizontal synchronizing pulses are obtained at the output terminal 18. In FIGURE 3 there is illustrated an example of the mixer circuit 22. One end of each pickup coil 17 of the pickup heads 13*a* and 13*b* is grounded while the other ends are connected respectively through DC blocking capacitors 23*a* and 23*b* to the base electrode of a transistor 24. The emitter electrode of the transistor 24 is grounded through a parallel circuit consisting of a resistor 25 and a by-pass capacitor 26, and the collector electrode is connected to a power supply terminal 29 through a tuning circuit 27 tuned to horizontal synchronizing signals (in the above example, 15.75 kc.) and, if necessary, through a resistor 28. Further, the collector electrode is connected to the output terminal through a coupling capacitor 30. In this case, a variable resistor 31' is connected between the other ends of the pickup coils 17 and the moving terminal of the resistor 31' is connected to the power supply terminal 29, thereby supplying the coils 17 with DC current. Reference numerals 31 and 32 identify base resistors of the transistor 24 respectively.

With such a connection as described in the foregoing, when the rotary shaft 2 is driven at for example, 30 c./s. pulses of 15.75 kc. are produced at the output terminal 18. In this case, the two pickup heads 13*a* and 13*b* are positioned at places confronting the gear 12, and the two detected pulses are averaged, so that wow resulting from uneven rotation of the gear 12 or a gear shaper is removed or decreased. Further, output voltage of pulses or gain increases because the pulses are added together. Moreover, the pickup heads 13*a* and 13*b* are formed in a manner so as to correspond to a plurality of the tooth 11 of the gear 12, so that the output of the pickup heads is averaged at any rotary position of the heads thereby to remove or decrease the aforementioned jitter and wow due to irregularity in rotation of the gear shaper or grinder. In addition, even if the gear 12 is eccentric to the rotary shaft 2, the two pulse outputs are averaged and consequently no fluctuation occurs in the output.

In order to record output video signals from the pickup camera 19 according to this system, the output of the pickup coil 10 and that of the mixer circuit 22 are applied respectively through switches 18' and 24 to vertical and horizontal synchronizing signal input terminals 25 and 26 of the camera 19. The video output terminal 33 of the camera 19 is connected through a switch 23 to the rotary magnetic head 4*a* and 4*b*. With the output pulses of the pickup coil 10 and mixer circuit 22, electron beam deflection of the camera 19 is carried out, thereby recording the output video signals of the camera 19 on the magnetic tape 5 in a predetermined relation without the necessity of special provision of a synchronizing signal generator for producing synchronizing signals for the camera 19. Reference numeral 6 indicates tracks of the recording. Further, the camera 19 may be operated with interlace scanning in the above numerical example. Since beam deflection scanning of the camera 19 is carried out in synchronization with the rotation of the rotary magnetic heads 4*a* and 4*b* for recording the output video signals of the camera 19, there is no need of selecting out synchronizing signals from the video signals to be recorded and synchronous control of the rotary magnetic heads with the synchronizing signals and consequently the output video signals of the camera 19 can be recorded on the magnetic tape 5 in a predetermined status. Thus, by the provision of simple-structured vertical and horizontal synchronizing signal generators on the rotary shaft of the magnetic heads, scanning of the camera and recording of its output signals can be accomplished without providing an expensive synchronizing signal generator at the camera side and a synchronous controller of the rotary magnetic heads requiring a great deal of skill. In this case, it is preferred to record vertical synchronizing signals of 60 c./s. as control signals on the marginal portion of the tape 5 in its lengthwise direction by contacting a magnetic head 20 with one marginal portion of the tape 5 and by connecting the pickup coil 10 to the magnetic head 20.

In order to reproduce a picture in such a magnetic recorder, control signals reproduced from the magnetic tape 5 and signals from the pickup coil 10 are compared thereby to control rotation of the motor 1 and the reproduced signals from the rotary magnetic heads 4*a* and 4*b* are applied to a receiver 21 through the switch 23, reproducing the recorded signals as a faithful picture. In the csae where the vertical and horizontal synchronizing signals other than the video signals and the control signals are not recorded on the magnetic tape 5 or if recorded, their recording level is low or the wave form of the synchronizing signals are out of shape, the output of the pickup coil 10 and that of the mixer circuit 22 are applied respectively through the switches 24 and 18' to vertical and horizontal synchronizing signal input terminals 34 and 35 of the receiver 21 as shown by the broken lines in FIGURE 1. In this manner, a deflection circuit device of the receiver 21 is controlled by the output of the pickup coil 10, reproducing a faithful picture.

In the foregoing, the pickup heads 13*a* and 13*b* are disposed symmetrical with respect to the rotary shaft 2 but they may be disposed symmetrical with respect to the plane including the rotary shaft 2. However, it is preferred to dispose them symmetrical with respect to the rotary shaft 2 for the purpose of reducing wow. Further, it is possible to decrease jitter and wow and to increase the pulse output by using more than two pickup heads and by adding together all the outputs of them. In the foregoing example the pickup coils 17 are supplied with DC current but such DC current is unnecessary if the teeth 11 or 15 or both of them are previously magnetized.

It will be apparent that many modifications and variations may be effected without departing from the scope of the novel concepts of this invention.

What I claim is:

1. In an apparatus for recording and reproducing video signals by means of head means rotated for scanning a magnetic tape; means for generating horizontal synchronizing pulses comprising a gear rotatable with said head means and having a predetermined number of spaced magnetic teeth, a plurality of pickup heads disposed adjacent the periphery of said gear and each adapted to generate signals in response to the movement of said magnetic teeth therepast, and mixing means for combining the signals from said pickup heads.

2. An apparatus according to claim 1, wherein said plurality of pickup heads is constituted by two pickup heads which are oppositely disposed adjacent the periphery of said gear.

3. An apparatus according to claim 1, wherein each of said plurality of pickup heads has a plurality of teeth spaced apart at approximately the same spacing as said gear teeth and arranged along a portion of the periphery of said gear.

4. An apparatus according to claim 1, wherein said apparatus further includes means rotatable with said head means for generating vertical synchronizing pulses.

5. An apparatus according to claim 4, wherein said means for generating vertical synchronizing pulses comprises a pair of magnetic strips rotatable with said head means and oppositely disposed with respect to their axis of rotation, and a pickup coil disposed adjacent the path of travel of said magnetic strips and adapted to generate signals in response to the movement of said magnetic strips therepast.

(References on following page)

References Cited

UNITED STATES PATENTS

| | | | |
|---|---|---|---|
| 2,254,626 | 9/1941 | Schade | 178—69.5 |
| 2,866,913 | 12/1958 | Kronacher | 326—135 |
| 3,402,257 | 9/1968 | Lange. | |
| 3,317,663 | 5/1967 | Van Dam. | |
| 3,322,892 | 5/1967 | Yasuoka et al. | |
| 3,263,027 | 7/1966 | Beltrami | 178—6.8 |

| | | | |
|---|---|---|---|
| 2,137,351 | 11/1938 | Schlesinger | 178—69.5 |
| 2,895,005 | 7/1959 | Kock et al. | |

ROBERT L. GRIFFIN, Primary Examiner

D. E. STOUT, Assistant Examiner

U.S. Cl. X.R.

178—69.5